July 26, 1955 H. C. GOODRICH, JR 2,714,187

VARIABLE HIGH FREQUENCY COUPLING TRANSFORMER

Filed July 2, 1951

INVENTOR
Hunter C. Goodrich, Jr.
BY
H. L. Newton
ATTORNEY

United States Patent Office 2,714,187

Patented July 26, 1955

2,714,187

VARIABLE HIGH FREQUENCY COUPLING TRANSFORMER

Hunter C. Goodrich, Jr., Collingswood, N. J., assignor to Radio Corporation of America, a corporation of Delaware Application July 2, 1951, Serial No. 234,698

6 Claims. (Cl. 323—56)

This invention relates generally to radio receivers and the like, and more particularly to a high frequency signal transformer for such a receiver wherein the coupling between the windings thereof is controllable.

The broad idea of varying the coupling between two windings of a transformer by means of a variation of core saturation, as exemplified by Patents 1,910,381 to Dowling and 2,216,631 to Sorensen, is well known. However, prior art devices of this type are generally characterized in that the controlling coil is magnetically coupled to the primary and secondary, and the inductance of the primary and secondary windings varies considerably when the coupling between them is varied. Such devices are thus subject to the disadvantage that the center of the pass band may vary appreciably with changes in bandwidth that result from changes in inductance.

It is therefore an object of this invention to provide a variable coupling transformer which obviates the above and other inherent disadvantages of the prior art.

It is a further object of this invention to provide an improved high frequency variable coupling transformer suitable, for example, for use in the signal channel of a radio receiver and particularly in the intermediate frequency amplifier portions thereof to provide variable selectivity.

It is another object of the invention to provide an improved variable coupling transformer for effecting automatic selectivity control in a receiver.

In accordance with one embodiment of this invention, the primary and secondary windings of a transformer are wound on H-shaped cores so positioned that there is no coupling between the windings due to placement. The H-shaped cores form part of a closed magnetic circuit having high and low saturability portions, and the primary and secondary windings are coupled by means of such magnetic circuit. A third winding is associated with the highly saturable portion of the magnetic circuit. Consequently, changes in current supplied to such third winding cause variations in the permeability of the magnetic circuit and thus effect variations in the multual coupling between the primary and secondary windings. This effect is utilized to provide desired changes in bandwidth and selectivity.

Unlike the prior art, the changes in mutual coupling between the primary and secondary windings of the transformer of the present invention are not accompanied by substantial changes in inductance of such windings. Therefore, no change in the center of the pass band occurs.

The above and other objects and advantages of my invention will become apparent upon consideration of the following detailed description when considered in connection with the accompanying drawing, in which like reference characters are used to indicate like elements throughout. In the drawing.

Figure 1:
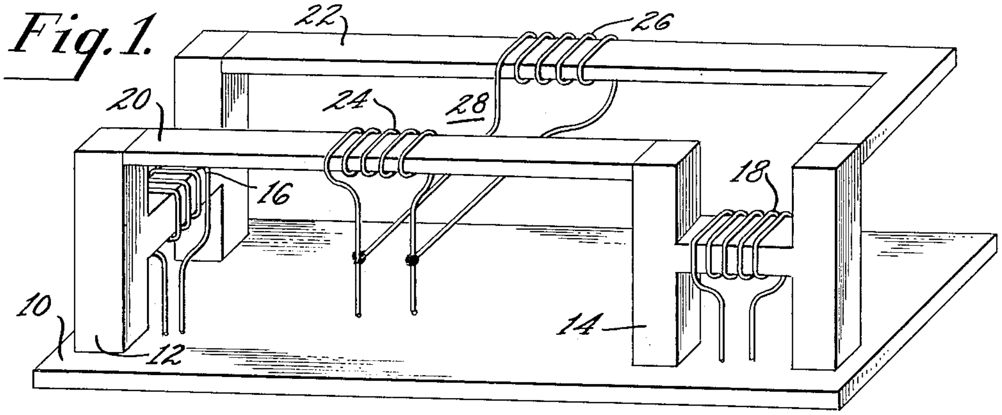
Figure 1 is a view in perspective illustrating a preferred variable coupling transformer embodying the present invention.
Figure 2:
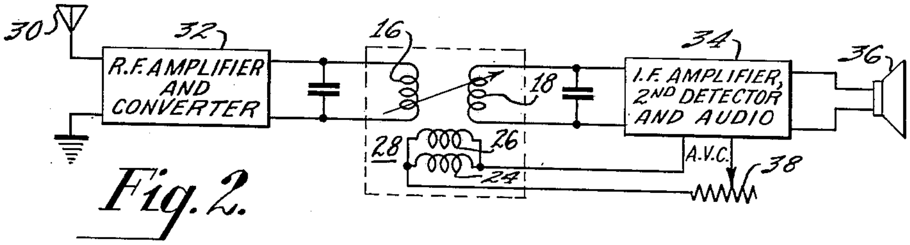
Figure 2 is a schematic circuit diagram of a radio receiver including a variable coupling transformer in accordance with the invention.
Figure 3:
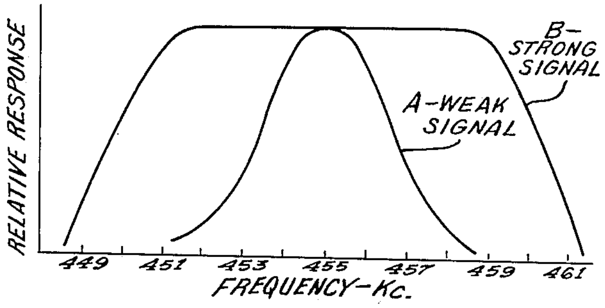
Figure 4:
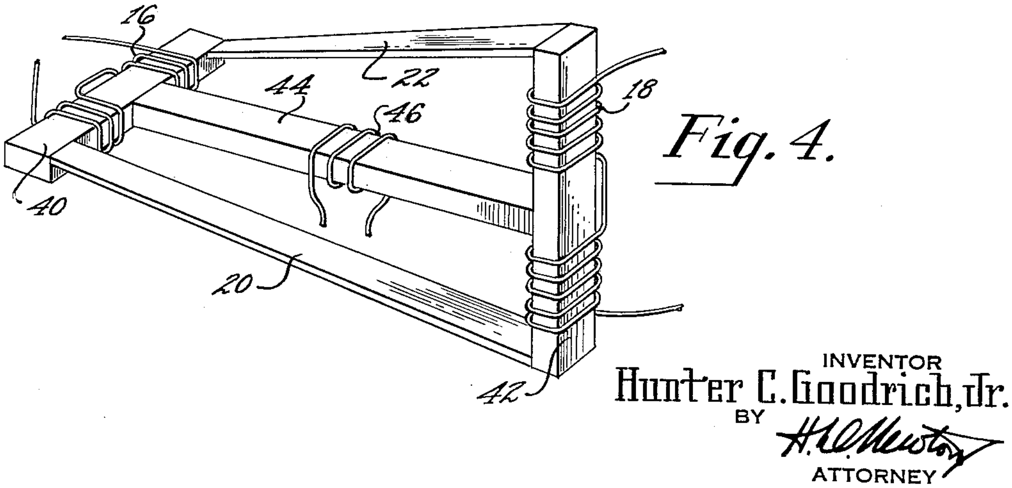

Figure 3 is graph showing curves which illustrate the relative response of a receiver employing the transformer of the invention of Figure 1 as a function of frequency, thereby showing the changes in selectivity that can be realized by the use of the present invention as illustrated in Figure 2, and Figure 4 is a view in perspective showing a modification of the transformer shown in Figure 1, in accordance with the invention.

Referring in detail to Figure 1, two H-shaped cores 12 and 14 are positioned at right angles to each other and fixed to a base 10. The cores and base consist of high permeability material having low saturability, such as certain ferrite materials. One core 12 supports the primary winding 16 of a transformer, while the other core 14 supports the secondary winding 18.

As shown in Figure 1, the result of positioning the cores 12 and 14 at right angles to each other is that the windings of the transformer are not coupled due to placement. Instead, they are coupled through a pair of parallel coupling rods 20 and 22, each of which respectively connects an upper portion of a leg of one core to an upper portion of a leg of the other core. Each of the coupling rods together with the legs it connects and the base plate forms a closed magnetic circuit. The coupling rods consist of highly permeable material that is more readily saturable than that of the core and base; certain ferrites are suitable.

It is desirable that all parts of the closed magnetic circuit consist of ferrites. The reason for this is that ferrites, which have a permeability much greater than one, are particularly useful in their employment in magnetic circuits at radio frequencies. The coupling rods may consist of the same ferrite material as the cores and base plate, or such rods may consist of one ferrite material while the cores and base plate consist of a different ferrite material.

A two-part saturating inductor 28 is comprised of a pair of parallel saturating windings or coils 24 and 26 wound about the respective rods 20 and 22. Thus each coil controls a closed magnetic circuit comprising its coupling bar, the legs of the cores connected by its coupling bar and the base.

The coupling rods 20, 22 are of smaller cross section than the rest of the closed magnetic circuit. Therefore, in response to an increase in a current flowing through the coils of the saturating inductor 28, such rods become saturated and lose permeability before the rest of the magnetic circuit. Such loss of permeability obviously will lessen the effect of the coupling bars on the primary and secondary windings 16 and 18, and the coupling between the primary and secondary windings will be reduced. On the other hand a decrease in current through the coils of the saturating inductor will cause the coupling rods to become less saturated and the consequent increase in permeability of these coupling rods effectually increases the coupling between the primary and secondary windings. It is obvious that the coupling between the primary and secondary windings may be made other than zero by placing the cores on the base so that the angle between them differs from a right angle. The coupling bars then aid or oppose the original coupling due to placement, and a variety of coupling characteristics may thus be provided. For example, assume there is an initial coupling between the coupling primary and secondary windings due to placement, and that the coupling rods are connected, as in Figure 1, so that the coupling due to the closed magnetic circuit is opposite to the coupling due to placement. It will be apparent that the net coupling between the primary and secondary windings will increase with an increase in saturation of the coupling rods, and such net coupling will decrease with a decrease in the saturation of the coupling rods. It should be noted in this connection that it is possible to vary the coupling between the primary and secondary windings so that zero coupling therebetween can be obtained.

It should also be noted that the primary and secondary windings 16 and 18 are balanced with respect to the saturating inductor 28, and they are therefore not coupled to them. The reason for this is explained as follows: The coils of the saturating inductor are wound in the same direction on the coupling rods 20 and 22, and these coils are connected, in parallel for example, as shown in Figure 1, so that the direction of the flux in the rods is the same in both. The effect of this is to prevent currents in the coils of the saturating inductors from affecting the primary and secondary windings. Also flux set up by the current in the primary winding is in opposite directions in the coupling rods, and thus the primary winding is prevented from loading the coils of the saturating inductor. Thus it is apparent that the primary and secondary windings are effectively decoupled from the saturating inductor.

Figure 2 illustrates, by way of example, the use of the invention in the intermediate frequency (I. F.) stage of a superheterodyne receiver. The conventional components of the receiver are shown in block diagram form, including the antenna 30, the radio frequency (R.-F.) amplifier and converter 34, the I.-F. amplifier, second detector and audio stages 34, and the loudspeaker 36. As illustrated, the primary winding 16 is connected to the output circuit of the converter, and the secondary winding 18 is connected to the input circuit of the I.-F. amplifier, as is conventional. The terminals of the saturating inductor 28 are connected to a source of current that is under the influence of the automatic volume control (AVC) circuit, which AVC circuit is conventionally derived from the second detector. Such source of current may be the plate circuits of one or more tubes controlled by the AVC circuit (not shown). Thus the inductor is supplied with current responsive to the signal level at the detector, resulting in a change in coupling between the primary and secondary windings and a consequent change in bandwidth and selectivity. No change in the inductance of the primary and secondary windings, and hence no change in the center of the pass band, occurs. Consequently, automatic selectivity control with signal strength is obtained.

A potentiometer 38 connected in series with the saturating inductor 28 represents any suitable means for varying the current in the saturating inductor and thus provides a degree of manual selectivity control.

Curves in Figure 3 represent the changes in selectivity that can be achieved using the transformer of the invention in a receiver as illustrated in Figure 2. Depending upon the strength of the signal, the bandwidth and the selectivity, is made sharp, as shown by curve A, or broad, as indicated by curve B, or may have characteristics intermediate between these limits. It should be noted in this connection that the broadening or narrowing of the bandwidth is symmetrical about the center of the pass band. This is indicative of the fact that the primary and secondary inductance remain substantially constant while the coupling between them is varied.

Figure 4 shows a further modification of a variable coupling transformer in accordance with this invention. Two straight bar cores 40 and 42 are made of ferrite or other magnetic material as referred to hereinafter and are set at right angles to each other and fixed at their centers to the ends of a connecting bar 44 of similar material. A primary winding 16 is wound around one bar core 40 so that such primary winding is balanced with respect to the connecting bar. A secondary winding 18 is similarly wound on the bar core 42. A saturating winding 46 is wound on the connecting bar 44. The coupling rod 20 connects one end of one bar core 40 to one end of the other bar core 42, and a coupling rod 22 connects the other ends of the bar cores.

It will be noted that in this modification, as in the embodiment shown in Figure 1, the primary and secondary windings 16 and 18 are balanced with respect to the saturating inductor, and they are therefore not coupled to it. Also the primary and secondary windings, as arranged on the bar cores 40 and 42, are not coupled due to placement.

The coupling rods 20 and 22, which are of smaller cross section than the bar cores 40 and 42 and the connecting bar 44, perform the same function as in the embodiment shown in Figure 1.

It is apparent here, also, that there may be initial coupling between the primary and secondary windings due to placement, as, for example, if the bar cores 40 and 42 on the ends of the connecting bar 44 are not perpendicular to each other. The coupling rods 20 and 22 then aid or oppose the original coupling due to placement to provide a variety of coupling characteristics as previously explained in connection with Figure 1.

In one embodiment of the invention, it has been found that the application of 6.3 ampere-turns of magnetomotive force (M. M. F.) from the coils of the saturating inductor changed the coupling from 2$\times$critical to 0.7$\times$critical.

From the foregoing description, it will be seen that a variable coupling transformer embodying the invention employs a closed magnetic circuit and is suitable for use at radio and intermediate frequencies. The primary and secondary windings, disposed to have no coupling, or predetermined coupling in some cases, due to placement, are coupled by means of a closed magnetic circuit comprised of highly permeable material and having high and low saturability portions. A saturating inductor is connected to a source of variable current and is employed to influence the easily saturable portions of the closed magnetic circuit. Through the inductor such variable current effects corresponding to changes in the coupling between the primary and secondary windings, and consequently change in bandwidth and selectivity are obtained. Such change in bandwidth is not attended by any substantial change in the inductance of the primary and secondary windings and therefore the center of the pass band remains unchanged.

What is claimed is:

1. A high frequency coupling transformer for tunable signal circuits and the like, for providing variable coupling and comprising, in combination, a magnetically permeable core structure, a primary winding on one portion of said core structure, a secondary winding on a second portion of said core structure, means including a saturating winding having at least one saturating coil for applying a saturating flux to said core structure; said core structure having a configuration such that said saturating winding provides two parallel independent flux paths in said structure and in which said primary and secondary windings provide separate series flux paths threading all of said windings.

2. In a high frequency signal transfer device, a magnetically permeable core structure of ferrite material, a primary winding on one portion of said structure, a secondary winding on a second portion of said structure at substantially a right angle to the axis of said primary winding, and saturating winding means including at least one coil associated with said core structure; said core having a configuration providing two parallel independent flux paths for said saturating winding and a series flux path threading all of said windings and in which the fluxes generated by the saturating winding in said parallel paths are in opposition in the series path.

3. A variable coupling high frequency transformer arrangement comprising a primary winding, a secondary winding, a base plate, two cores, each of said cores having two parallel leg portions and a connecting portion, said leg portions being fixed upright to said base plate, said leg portions respectively supporting said windings, said plate and said cores consisting of material of high permeability and low saturability, two easily saturable and highly permeable thin rods, said rods respectively connecting the upper leg portions of said cores, an inductor comprising two coils, said coils respectively being supported on said rods, an input circuit for said primary winding, an output circuit for said secondary winding, and a separate current input circuit for said inductor to supply current thereto, whereby changes in current through said inductor effect variations in the coupling between said primary and said secondary windings.

4. A radio frequency transformer instrumentality comprising, in combination, a base plate, two H-shaped cores fixed to said base plate and supported upright thereon, said cores being arranged on said base plate substantially at right angles to each other, said base plate and said cores consisting of highly permeable material of low saturability, two thin rods, said rods connecting respectively one leg of one of said cores to one leg of the other of said cores, said rods consisting of highly permeable and highly saturable material, a primary winding supported on one of said cores, a secondary winding supported on the other of said cores, and a saturating winding comprised of two coils respectively supported on said rods.

5. A radio frequency transformer instrumentality comprising, in combination, a base plate, two cores, each of said cores having two parallel leg portions and an intermediate connecting portion, said leg portions being supported upright on said base plate, said cores being arranged on said base plate with said intermediate connecting portions substantially at right angles to each other, said base plate and said cores consisting of highly permeable ferrite material of low saturability, two rods connecting respectively an upper leg portion of one of said cores to an upper leg portion of the other of said cores, said rods consisting of highly permeable and highly saturable ferrite material, a primary winding supported on the intermediate connecting portion of one of said cores, a secondary winding supported on the intermediate connecting portion of the other of said cores, and a saturating winding comprised of two coils respectively supported on said rods.

6. As an article of manufacture, a base plate, two cores, each having two parallel leg portions and an intermediate connecting portion, said leg portions being supported upright on said base plate, said cores and said base plate consisting of highly permeable ferrite material having low saturability, two rods connecting respectively one upper leg portion of one of said cores with one upper leg portion of the other of said cores, said rods consisting of highly permeable and highly saturable ferrite material, a winding supported on the intermediate connecting portion of each of said cores, and a winding comprised of two coils respectively supported on said rods.

References Cited in the file of this patent

UNITED STATES PATENTS

| | | |
|---|---|---|
| 1,815,516 | Lee | July 21, 1931 |
| 2,216,631 | Sorensen | Oct. 1, 1940 |
| 2,464,639 | Fitzgerald | Mar. 15, 1949 |
| 2,519,425 | Barlow | Aug. 22, 1950 |
| 2,519,426 | Grant | Aug. 22, 1950 |

OTHER REFERENCES

Snoek, Philips Technical Review, vol. 8, No. 12, December 1946, pp. 353–360.